United States Patent [19]

Hashimoto

[11] 4,109,265
[45] Aug. 22, 1978

[54] FOCAL PLANE SHUTTER

[75] Inventor: Akihiko Hashimoto, Hachioji, Japan

[73] Assignee: Olympus Optical Company Ltd., Tokyo, Japan

[21] Appl. No.: 750,822

[22] Filed: Dec. 15, 1976

[30] Foreign Application Priority Data

Dec. 25, 1975 [JP] Japan .................................. 50-155296
Dec. 25, 1975 [JP] Japan .................................. 50-155297

[51] Int. Cl.² ............................................... G03B 9/28
[52] U.S. Cl. .................................................. 354/244
[58] Field of Search ......................... 354/242, 243, 244

[56] References Cited

U.S. PATENT DOCUMENTS

| | | | |
|---|---|---|---|
| 1,458,211 | 6/1923 | Kingsbury | 354/243 |
| 3,468,236 | 9/1969 | Renlschler et al. | 354/243 |
| 3,491,673 | 1/1970 | Forys | 354/243 |
| 3,739,704 | 6/1973 | Okeyoma | 354/243 |

*Primary Examiner*—Donald A. Griffin
*Attorney, Agent, or Firm*—Ostrolenk, Faber, Gerb & Soffen

[57] ABSTRACT

A focal plane shutter comprises a first and a second blind, a take-up and a winding drum supporting the opposite ends of the first blind, a take-up and a winding drum supporting the opposite ends of the second blind, a first blind winding pinion and a second blind winding pinion having an operationally integral relationship with the first and the second blind winding drum, respectively, and a pair of shutter winding sector-shaped gears in meshing engagement with the first and the second blind winding pinion, respectively, and adapted to rotate in response to a shutter charging command. Each of the sector-shaped gears have a hiatus which is located opposite to the associated pinion to release the meshing engagement when no shutter winding operation takes place. The sector-shaped gears and the pinions are located relative to each other in a manner such that rotation of the first blind winding pinion precedes rotation of the second blind winding pinion when a shutter winding operation is to be commenced.

11 Claims, 12 Drawing Figures

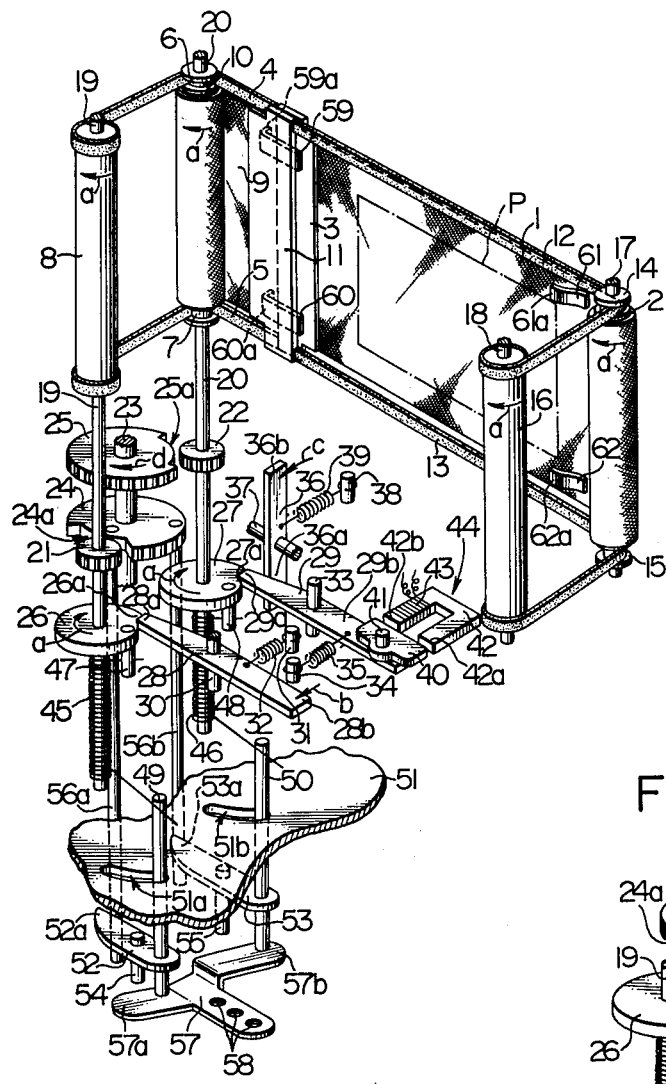
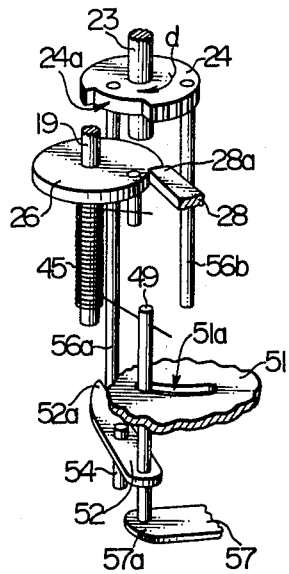
FIG. 1
FIG. 2

FOCAL PLANE SHUTTER

BACKGROUND OF THE INVENTION

The invention relates to a focal plane shutter.

In a focal plane shutter, the shutter blinds which have run are wound or charged subsequent to the completion of an exposure, by utilizing shutter blind winding gears which are interlocked with a film winding operation, for example, to drive pinions which are associated with shutter blind winding drums. A conventional winding apparatus comprises pinions and gears which are normally maintained in meshing engagement with each other. However, this may present a problem in providing a high speed shutter operation because the gears represent a load on the shutter blinds as they run. A type of winding apparatus is available in which both the first and the second pinions are simultaneously driven. With this construction, if there happens to be an opening between the two blinds when the shutter blinds have come to a stop, the winding procedure is performed with the opening maintained between the two blinds, thus disadvantageously exposing the film chamber to a taking lens path.

There is another problem involved with the conventional construction of prior art focal plane shutters. A focal plane shutter is constructed such that an exposure value is determined by both a diaphragm aperture and a time delay between the running of the first and second shutter blinds which is determined by a photometric result. With a high speed operation or when the exposure period is very brief, the second blind starts to run soon after the first blind has started to run, thereby forming a slit of a width which is substantially reduced relative to the width of an image field. Light from an object being photographed is made to impinge upon a film surface while the slit travels across the film field. Consequently, the slit width must be maintained constant during the shutter operation in order to assure a uniform exposure. However, a conventional focal plane shutter is generally designed such that the second blind runs slightly faster than the first blind in order to improve the accuracy of the exposure period. In extreme instances, the second blind, which initiates running with a certain delay after the first blind has started to run, may catch up with the first blind, resulting in a closed shutter condition while the two blinds travel across the film field. In such instance, there will be no exposure at all or an insufficient exposure.

SUMMARY OF THE INVENTION

It is an object of the invention to provide a focal plane shutter in which above disadvantages are eliminated by utilizing, for shutter blind winding purposes, a pair of sector-shaped gears each having a hiatus and which maintain a phase difference therebetween in the position at which they start to mesh with a first blind and a second blind winding pinion, respectively, and which have their hiatus located opposite pinions to release them from the meshing engagement with the latter when no blind winding operation takes place, the winding of the first blind being initiated slightly earlier than the second blind when a winding operation is to take place so that both blinds are wound while maintaining an overlapping relationship relative to each other, the pair of sector-shaped gears also permitting an individual fine adjustment of the position of the respective gears.

It is another object of the invention to provide focal plane shutter which assures a minimum slit width between the shutter blinds by providing a resilient tab on at least one of the end members of the first and second blind at a position which is removed from the image field.

BRIEF DESCRIPTION OF THE DRAWINGS

FIG. 1 is a perspective view of a focal plane shutter constructed in accordance with one embodiment of the invention;

FIG. 2 is a fragmentary perspective view of the focal plane shutter;

DETAILED DESCRIPTION OF PREFERRED EMBODIMENT

Figure 3:
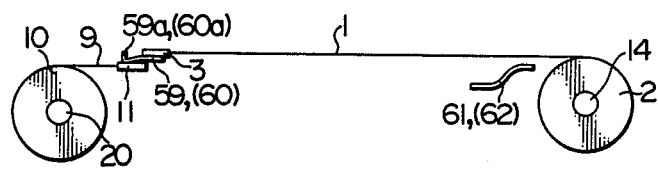
FIGS. 3 to 7 are schematic plan views illustrating the various phases of operation of the focal plane shutter.

Referring to FIG. 1, there is shown a first blind 1 of a shutter which has its right-hand end wrapped around a first blind take-up drum 2. An end member 3 is fixedly attached to the left-hand end of the first blind 1, and has its upper and lower ends connected with one end of an upper string 4 and a lower string 5 which are utilized for pulling the first blind. The strings 4, 5 are passed around pulleys 6, 7, respectively, and are wound around a first blind winding drum 8. A second blind 9 of the shutter has its left-hand end wrapped around a second blind winding drum 10, and has an end member 11 fixedly mounted on its right-hand end. A pair of upper and lower strings 12, 13 are secured to the upper and lower portions of the end member 11 for pulling the second blind. The strings 12, 13 pass around pulleys 14, 15, respectively, and are wrapped around a second blind take-up drum 16.

The take-up drums 2, 16 are mounted on respective shafts 17, 18 with coiled, winding springs (not shown) interposed therebetween, these coiled springs normally operating to strongly urge the drums 2, 16 to rotate in the direction indicated by an arrow $a$ or in the shutter blind take-up direction. The winding drums 8, 10 are fixedly mounted on respective shafts 19, 20, which have a first blind winding pinion 21 and a second blind winding pinion 22 fixedly mounted thereon, respectively, at a position below the respective drums. The pulleys 6, 7 and 14, 15 are rotatably mounted on the shafts 20, 17 on the opposite sides of the drums 10, 2, respectively. However, these pulleys may be mounted on separate shafts from the support shafts 20, 17 for the drums 10, 2.

A pair of gears comprised of first blind winding gear 24 and second blind winding gear 25 are fixedly mounted on a shutter winding shaft 23, and are located adjacent to the pinions 21, 22, respectively. Each of the gears 24, 25 is provided with a hiatus or gap 24a and 25a, respectively, and in the position shown in FIG. 1, each hiatus 24a, 25a is presented toward its associated pinion 21, 22, respectively, thus interrupting the meshing engagement between these gears and the pinions.

At positions below the pinions 21, 22, the shafts 19, 20 have fixedly mounted thereon a first blind locking cam disc 26 and a second blind locking cam disc 27, respectively, each having a peripheral notch 26a, 27a, which notches are in turn engaged by an end 28a, 29a of a first blind locking lever 28 and a second blind locking lever 29, respectively. A force tending to rotate both shutter winding shafts 19, 20 is transmitted from the take-up drums 2, 16 through the both blinds 1, 9 and the shutter winding drums 8, 10, but in the condition shown in FIG. 1, the resulting rotation is prevented by the engagement of the ends 28a, 29a of the locking levers 28, 29 with the notches 26a, 27a.

The first blind locking lever 28 is rotatably mounted on a pin 30, and is urged by a coiled spring 32 to have its end 28a held against the peripheral surface of the first blind locking cam disc 26, the spring 32 having its one end anchored to a stationary pin 31 and having its other end engaged with an arm 28b of the lever 28 which arm is located on the opposite side of the end 28a relative to pin 30. The second blind locking lever 29 is rotatably mounted on a pin 33, and is urged by a coiled spring 35 to have its end 29a removed from the peripheral surface of the second blind locking cam disc 27, the spring 35 having its one end anchored to a stationary pin 34 and its other end engaged with an arm 29b of the lever 29 which is located on the opposite side of the end 29a relative to pin 31. On the rear side or on the side which is removed from the cam disc 27, an arm of the locking lever 29 extending between the pin 33 and the end 29a is engaged by a portion 36a of a lock-hold lever 36, which is rotatably mounted on a pin 37 and which is urged by a coiled spring 39 in a direction to maintain the second blind locking lever 29 in abutment against the second blind locking cam disc 27. The spring 39 has its one end anchored to a stationary pin 38 and its other end engaged with an arm of the lever 36 which is located on the opposite side of the pin 37 from the portion 36a.

The second blind locking lever 29 includes another arm 29b, on the end of which is fixedly mounted a pin 41 rotatably carrying a clapper 40. The clapper 40 is located opposite to a pair of limbs 42a, 42b of an electromagnet 44 having a core 42 on which a coil 43 is disposed. The electromagnet 44 is energized in response to a shutter release, and is deenergized by a photometric device, not shown, at the time when a proper amount of exposure is given to a film, not shown. The energization and deenergization of the electromagnet controls the operation of the second blind locking lever 29. As will be further described later, the first blind locking lever 28 and the second blind lock-hold lever 36 are adapted to move away from the first blind locking cam disc 26 and the second blind locking lever 29, respectively, in response to a shutter release.

A pair of braking torsion springs 45, 46 are disposed on the shafts 19, 20, respectively, at positions below the sector-shaped gears, and have one of their ends bearing against pins 47, 48, fixedly mounted on and depending downwardly from the lower surface of the respective cam discs 26, 27, and have their other ends bearing against a top portion of a braking pin 49, 50, respectively. These braking pins 49, 50 respectively extend through arcuate slots 51a, 51b formed in a stationary plate 51, and are fixedly mounted on the ends of respective arms of a pair of braking levers 52, 53. The levers 52, 53 are rotatably mounted on pins 54, 55, respectively, and their other ends 52a, 53a are located adjacent to a pair of brake release pins 56a, 56b fixedly mounted on and depending downwardly from the lower surface of the first blind winding gear 24. The arcuate slots 51a, 51b are located on an arc of circles which are centered about the pins 54, 55, respectively.

The braking pins 49, 50 extend below the braking levers 52, 53, and disposed below their lower ends are a pair of brakes 57a, 57b which are formed as an integral part of a braking member 57, which comprises a resilient blade. The brakes 57a, 57b have a slant formed therein, rising from their right-hand end to their left-hand end so that as the braking pins 49, 50 move from right to left within the respective slots 51a, 51b as will be described later, they undergo an increasing friction against the brakes 57a, 57b. The braking member 57 is fixedly mounted, as shown at 58, on a stationary member (not shown) by using set screws.

A pair of resilient tabs 59, 60 are respectively secured near the top and bottom of the end member 3 of the first blind 1 at positions which are located outside an image field P (shown in phantom line) of the film. Each of the tabs 59, 60 has a folded end 59a, 60a which is maintained by its own resilience in the path of movement of the second blind 9 (see FIG. 4). However, when the shutter is not operated, the folded ends 59a, 60a are moved out of the path by the end member 11 of the second blind 9 (see FIGS. 1 and 3). In the right-hand portion of FIG. 1 or toward the terminal end of the path of movement of the blinds, there are provided a pair of guide members 61, 62 which have their ends 61a, 62a fixedly mounted on suitable stationary members, not shown, for urging the folded ends 59a, 60a of the resilient tabs 59, 60 out of the path of movement of the shutter blind. Alternatively, resilient tabs 59 and 60 may be coupled to the end member 11 of second blind 9 wherein the relative functions of end members 3 and 11 would be reversed.

The operation of the focal plane shutter will now be described. FIG. 1 shows a condition of the shutter in which a shutter winding operation is finished and a shutter release may be triggered. Under this condition, the first blind 1 covers the image field P of the film, and each hiatus 24a, 25a of the winding gears 24, 25 is presented facing toward the pinions 21, 22, which thus do not mesh with the gears 24, 25. The braking pins 49, 50 are located opposite the right-hand end portions of the brakes 57a, 57b and thus are not braked.

In response to a shutter release, the arm 28b of the first blind locking lever 28 is pushed in the direction indicated by an arrow b, whereby the end 28a of first blind locking lever 28 is disengaged from the notch 26a formed in the cam disc 26. Also, the arm 36b of the lock-hold lever 36 is pushed in the direction indicated by an arrow c in response to the shutter release, whereby the portion 36a is disengaged from the second blind locking lever 29. In addition, the electromagnet 44 is energized in response to the shutter release to attract the clapper 40 mounted on the second blind locking member 29, thus taking place of the lock-hold lever 36 to maintain the lever 29 in its initial position in which it locks the cam disc 27.

When the lever 28 is disengaged from the cam disc 26, the first blind winding drum 8 is released from constraint, whereby the rotative power stored in the first blind take-up drum 2 is effective to take up the first blind 1, which thus runs in the direction from drum 8 to drum 2 to produce an exposure of the image field P. At this time, the resilience of the torsion spring 45 acts on the cam disc 26 to assist the running of the first blind 1.

As the first blind 1 runs to be taken up on the take-up drum 2, the first blind winding drum 8 follows to rotate in the direction of the arrow a together with its support shaft 19. As the shaft 19 rotates, the cam disc 26 rotates in the same direction, whereby the pin 47 thereon moves in a direction away from the torsion spring 45. The cam disc 26 is designed to rotate through exactly two revolutions from its start position until the end of running of the first blind 1. Toward the beginning of the second revolution, the pin 47 thereon bears against the torsion spring 45 from the side which is opposite to the side from which it engaged the spring 45 initially, thus angularly moving the torsion spring 45. The torsion spring 45 continues to rotate, clearing the braking pin 49, and bears against it from the opposite side toward the end of the second revolution of the cam disc 26. As a consequence, the braking pin 49 moves from right to left within the slot 51a, and is subjected to an increasing braking effect applied by the brake 57a (see FIG. 2). The braking effect is transmitted to the cam disc 26 through the torsion spring 45, and also acts through the shaft 19 and the first blind winding drum 8 to retard the running of the first blind 1. In this manner, a desirable braking action is applied to the first blind 1 toward the end of its running. About this time, the first blind locking lever 28 returns to a position in which it locks the cam disc 26, which is therefore locked by the lever 28.

After the first blind 1 has commenced running, the electromagnet 44 is deenergized by a photometric device when a proper amount of exposure is reached, thereby releasing the clapper 40 on the second blind locking lever 29. Thereupon the lever 29 rotates under the resilience of the coiled spring 35 in a direction to move the end 29a away from the notch 27a formed in the cam disc 27, thus freeing the cam disc 27.

When the cam disc 27 is freed, there is no longer constraint on the second blind 9, which therefore begins to run, under the action of the rotative power stored in the second blind take-up drum 16, to be taken up thereon, thus closing the image field P to terminate a photographic cycle. During the running of the second blind 9, the torsion spring 46, braking pin 50 and brake 57b function in a manner similar to the operation of the torsion spring 45, control pin 49 and brake 57a to apply a desirable braking action on the running of the second blind 9.

Figure 4:
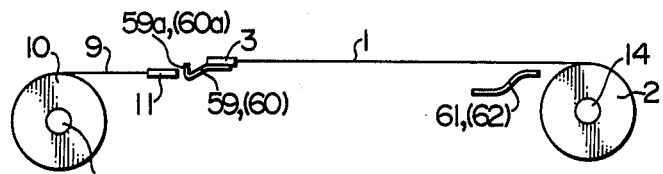
Figure 5:
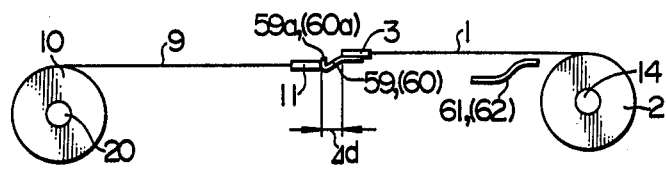
Figure 6:
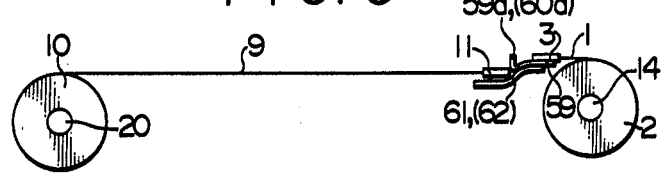
Figure 7:
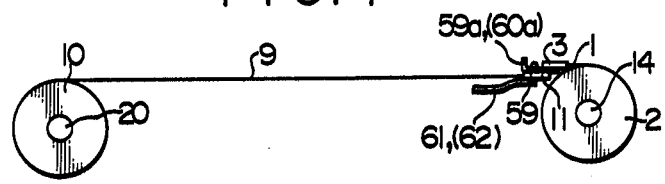

FIGS. 3 to 7 show the relationship between the first and second blinds 1, 9 during a high speed shutter operation. Prior to a shutter release, both blinds 1, 9 are maintained in their initial position in which the end members 3, 11 are in overlapping relationship, as shown in FIG. 3. The folded ends 59a, 60a of the resilient tabs 59, 60 are held out of the path of movement of the second blind 9 by the action of the end member 11 provided thereon. When the first blind 1 begins to run in response to a shutter release, the folded ends 59a, 60a are disengaged from the end member 11 and resiliently move back onto the path of movement of the second blind 9. When the second blind 9 begins to run subsequent to the running of blind 1, it follows the first blind 1 as shown in FIG. 4, and eventually catches up with the first blind 1 as shown in FIG. 5 because its running speed is faster than that of the first blind 1. However, the end member 11 is subsequently maintained in abutment against the folded ends 59a, 60a of the resilient tabs 59, 60, so that both blinds 1, 9 run while maintaining a slit-like space therebetween of a width which corresponds to the effective length of extension $\Delta d$ of the tabs 59, 60. In this manner, a minimum slit having a width $\Delta d$ is assured during a high speed operation of the shutter, thus preventing a failure of providing an exposure from occurring.

Toward the end of running of the first blind 1 (see FIG. 6), the folded ends 59a, 60a of both resilient tabs 59, 60 are urged out of the path of movement of the second blind by the guide members 61, 62, so that the end member 11 on the second blind can terminate its running while passing between the tabs 59, 60 and the guide membes 61, 62. The provision of the guide members 61, 62 avoids the abutment of the end member 11 against the folded ends 59a, 60a which might give rise to a bouncing or a damage to other parts.

Figure 8:
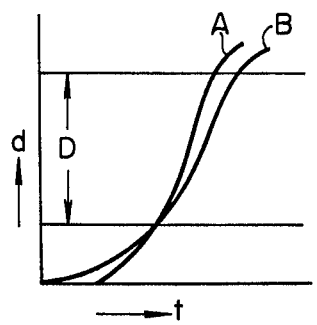
FIGS. 8 and 9 graphically show the operation of the shutter blinds.
Figure 9:
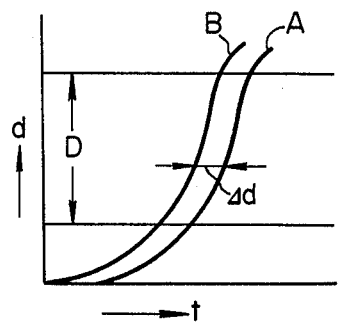

In FIG. 8, curves A and B represent the distances $d$ travelled by the first blind 1 and the second blind 9, respectively, of a conventional shutter, as plotted against the exposure period $t$. It is seen from this Figure that both blinds may travel across the image field P while maintaining an overlapping relationship, thus failing to provide a proper exposure. With the focal plane shutter according to the invention, the provision of the resilient tabs 59, 60 assures a minimum slit width of $\Delta d$ as shown in FIG. 9, thus assuring a proper exposure even during a high speed shutter operation.

Figure 10:
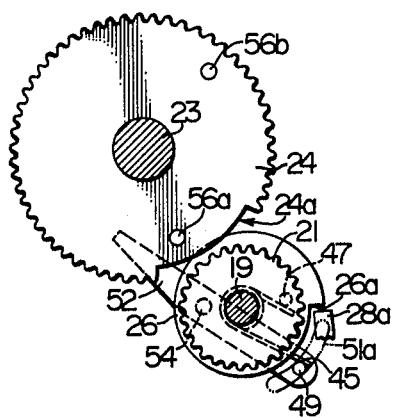
FIGS. 10 and 11 are fragmentary plan views of a braking release device.
Figure 11:
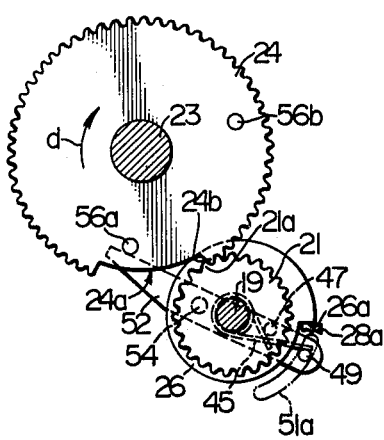

When the both blinds have terminated their running to complete an exposure of one frame of the film, there follows a winding operation of the both shutter blinds 1, 9. The winding operation of the shutter blinds 1, 9 takes place in response to a film winding operation, which is performed by driving the shutter winding shaft 23 in a direction indicated by an arrow $d$ (see FIG. 2). As used herein, the term shutter charging operation refers to that operation wherein the film is advanced and the first and second shutter blinds are rewound on the first and second winding drums; the term shutter release operation refers to that operation which initiates a shutter running operation; and a shutter running operation refers to that operation wherein the first and second blinds are released from the first and second winding drums and are wound about the first and second take-up drums. Also as used herein, the term shutter winding direction is that direction wherein the first and second shutter blinds are moved in the direction from the first and second take-up drums toward the first and second winding drums. As the shaft 23 is driven in the direction of arrow $d$, the both winding gears 24 and 25 rotate in the same direction, and the brake release pins 56a, 56b fixedly mounted on the first blind winding gear 24 angularly move the arms 52a, 53a of the braking levers 52, 53 until the braking pins 49, 50 fixedly mounted thereon are displaced from their braked position (FIG. 2) to their brake-free position (FIG. 1). FIGS. 10 and 11 illustrated such operation in terms of the braking lever 52.

When the braking action is released in this manner, the both blinds 1, 9 which remain at rest in positions become free to be driven into a normal take-up position, and accordingly, the both pinions 21, 22 are properly positioned. Thus, the winding gears 24, 25 for the blinds 1, 9 are brought into proper meshing engagement with the pinions 21, 22 to define the winding initiating position of these blinds during a shutter winding operation, which assures that the blinds start their running from their correct positions at the next time the shutter is operated. Specifically, considering the first blind winding gear 24, its beginning tooth 24b is capable of initiating a meshing engagement with a particular tooth 21a on the first blind pinion 21 (see FIG. 11).

Figure 12:
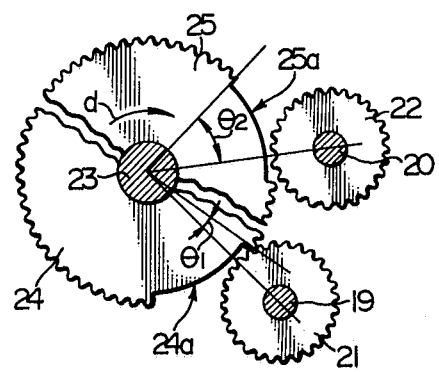
FIG. 12 is a plan view showing the relative position between the first and second blind winding gears and the first and second blind winding pinions.

In response to the rotation of the shutter winding shaft 23, the first blind winding gear 24 and the second blind winding gear 25 both rotate in the direction of the arrow $d$ to drive the pinions 21, 22 so that these pinions are driven through two revolutions in the opposite direction from the arrow $a$ during one revolution of the gears. Referring to FIG. 12, an angle $\sigma 1$ through which the first blind winding gear 24 rotates from its initial position until it begins to mesh with the first blind winding pinion 21 is chosen smaller than an angle $\sigma 2$ through which the second blind winding gear 25 rotates from its initial position until it begins to mesh with the second blind winding pinion 22. Consequently, after both gears 24, 25 have started to rotate, the first blind winding gear 21 is initially driven, and the second blind winding pinion 22 begins to be driven after the both gears 24, 25 have rotated through an angle corresponding to $\sigma 2 - \sigma 1$.

Driving both pinions 21, 22 with a time delay therebetween assures that the first blind 1 is initially moved in the winding direction to be brought into an overlapping relationship with the second blind before the latter is driven in the winding direction. The blinds 1, 9 are wound while maintaining both end members 3, 11 in overlapping relationship, thus preventing any adverse incidence of undesirable light onto the film. Toward the end of the winding operation, the winding of the first blind is initially terminated, followed by the termination of the winding of the second blind 9 after a rotation of both gears 24, 25 through an angle corresponding to $\sigma 2 - \sigma 1$. Now both blinds 1, 9 resume the normal relative position.

During the rotation of the blind winding gears 24, 25 through one revolution, both blinds 1, 9 return to their original positions shown in FIG. 1 as do the other members. The torsion springs 45, 46 return to their original positions by a procedure which is substantially similar to, though in the opposite sequence, the procedure which they experienced when initiating the running of the blinds 1, 9. Since the braking action of the braking member 57 is continuously interrupted during a shutter winding operation, shutter winding therefore can be effected without undue stressing.

What is claimed is:

1. A focal plane shutter comprising:
   a first and a second shutter blind;
   a first take-up drum and a first winding drum supporting first and second ends of said first blind, respectively;
   a second take-up drum and a second winding drum supporting first and second ends of said second blind, respectively;
   a first blind winding pinion and a second blind winding pinion mounted on said first blind winding drum and said second blind winding drum, respectively, for integral operation with said first blind winding drum and said second blind winding drum, respectively;
   means for driving said first blind winding pinion and said second blind winding pinion in a shutter winding direction responsive to a shutter charging operation;
   said drive means comprising a first and a second shutter winding sector shaped gear adapted to rotate into meshing engagement with said first and said second blind winding pinions, respectively, in response to a shutter charging operation, each of said sector-shaped gears having a predetermined orientation prior to the initiation of a shutter charging operation;
   each of said first and second sector-shap gears having a gap formed therein, said gap in said first gear and said gap in said second gear formed at a location which is opposite to said first and second winding pinions, respectively, when said first and second gears are in said predetermined positions, whereby said first and second gears are maintained out of meshing engagement with said first and second pinions, respectively, when a shutter charging operation does not take place, said gears being positioned such that said first blind winding pinion precedes said second blind winding pinion in rotation when a shutter charging operation is initiated.

2. A focal plane shutter according to claim 1, wherein one of said first and second ends of said first blind defines a trailing edge of said first blind, one of said first and second ends of said second blind defines a leading edge of said second blind, and wherein said first and second blinds are located in a predetermined position after a shutter charging operation but prior to a shutter release operation, said focal plane shutter further comprising:
   (A) a first end member secured to said trailing end of said first blind;
   (B) a second end member secured to said leading end of said second blind; and
   (C) a resilient tab mounted on said first end member at a position out of an image field of said camera, said tab having a tip which:
      (1) contacts said second end member so as to be moved out of the path of movement of said second blind when said first and second blinds are in said predetermined positions, said tip of said tab extending a predetermined length from said first end member; and
      (2) is freed from said second end member and moves into the path of movement of said second blind when said first and second blinds are spaced apart by a distance greater than said predetermined length, whereby a slit having a width which is at least equal to said predetermined length is assured between said blinds during a shutter running operation.

3. A focal plane shutter according to claim 2, also including a guide member located within said camera at a position which will move said tab out of the path of movement of said second blind at the end of a shutter release operation.

4. A focal plane shutter according to claim 1, wherein one of said first and second ends of said blind defines a trailing edge of said first blind, one of said first and second ends of said second blind defines a leading edge of said second blind, and said first and second blinds are located in a predetermined position after a shutter charging operation but prior to a shutter release operation, said focal plane shutter further comprising:
   (A) a first end member secured to said trailing end of said first blind;
   (B) a second end member secured to said leading end of said second blind; and
   (C) a resilient tab mounted on said second end member at a position out of an image field of said camera, said tab having a tip which:
      (1) contacts said first end member so as to be moved out of the path of movement of said first blind when said first and second blinds are in said predetermined positions, said tip of said tab extending a predetermined length from second end member; and (2) is freed from said first end member and moves into the path of movement of said first blind when said first and second blinds are spaced apart by a distance greater than said predetermined length, whereby a slit having a width which is at least equal to said predetermined length is assured between said blind during a shutter release operation.

5. A focal plane shutter according to claim 4, also including a guide member located within said camera at a position which will move said tab out of the path of movement of said first blind at the end of a shutter running operation.

6. A focal plane shutter according to claim 1, wherein one of said first and second ends of said first blind defines a trailing edge of said first blind and one of said first and second ends of said second blind defines a leading edge of said second blind and wherein said focal plane shutter further comprises:

shutter operating means responsive to a shutter release operation for successively running said first and second blinds, said shutter operating means to cause said first blind to begin running prior to said second blind; and flexible members secured to said trailing edge of said first blind and normally urged into the path of movement of said second blind, the freed ends of said flexible members extending a predetermined distance from said trailing edge of said first blind towards said leading edge of said second blind when said free ends of said flexible members are in the path of said second blind whereby a predetermined spacing between said trailing edge of said first blind and said leading edge of said second blind is assured during a shutter running operation.

7. A focal plane shutter according to claim 6, further comprising guide members located within said camera at positions which will move said flexible members out of the path of movement of said second blind at the end of a shutter running operation.

8. A focal plane shutter according to claim 7, further including means for locating said first and second blinds in a predetermined position after a shutter charging operation but prior to a shutter release operation, the relative positions of said first and second blinds in said predetermined position being such that the ends of said flexible members overlap the leading edge of said second blind and said flexible members are biased out of the path of movement of said second blind.

9. A focal plane shutter according to claim 1, wherein one of said first and second ends of said first blind defines a trailing edge of said first blind and one of said first and second ends of said second blind defines a leading edge of said second blind and wherein said focal plane shutter further comprises:

shutter operating means responsive to a shutter release operation for successively running said first and second blinds, said shutter operating means to cause said first blind to begin running to said second blind; and flexible members secured to said leading edge of said second blind and normally urged into the path of movement of said first line, the free ends of said flexible members extending a predetermined distance from said leading edge of said second line towards said trailing edge of said first line when said free ends of said flexible members are in the path of said first line whereby a predetermined spacing between said trailing edge of said first line and said leading edge of said second line is assured during a shutter running operation.

10. A focal plane shutter according to claim 9, further comprising a plurality of guide members located within said camera at positions which will move said flexible members out of the path of movement of said first blind at the end of a shutter running operation.

11. A focal plane shutter according to claim 10, further including means for locating said first and second blinds in a predetermined position after a shutter charging operation but prior to a shutter release operation, the relative positions of said first and second blinds in said predetermined position being such that the ends of said flexible members overlap the leading edge of said first blind and said flexible members are biased out of the path of movement of said first blind.

* * * * *